United States Patent [19]

Harada et al.

[11] Patent Number: 5,798,758

[45] Date of Patent: Aug. 25, 1998

[54] GESTURE-BASED DATA PROCESSING METHOD AND APPARATUS

[75] Inventors: Takashi Harada, Yamato; Ryoji Fukuda, Kawasaki, both of Japan

[73] Assignee: Canon Kabushiki Kaisha, Tokyo, Japan

[21] Appl. No.: 630,750

[22] Filed: Apr. 10, 1996

[30] Foreign Application Priority Data

Apr. 14, 1995 [JP] Japan .................. 7-113855

[51] Int. Cl.⁶ .................. G06K 9/00; G06F 3/00
[52] U.S. Cl. .................. 345/339; 345/352; 345/358
[58] Field of Search .................. 395/339, 340, 395/335, 326, 333; 345/339, 326, 340, 327, 342, 341, 350, 352, 353, 354, 355, 356, 357

[56] References Cited

U.S. PATENT DOCUMENTS

| | | | |
|---|---|---|---|
| 4,648,064 | 3/1987 | Morley | 364/900 |
| 4,695,941 | 9/1987 | Andreason et al. | 364/200 |
| 4,701,845 | 10/1987 | Andreasen et al. | 364/200 |
| 5,063,600 | 11/1991 | Norwood | 382/13 |
| 5,179,702 | 1/1993 | Spix et al. | 395/650 |
| 5,347,295 | 9/1994 | Agulnick et al. | 345/156 |
| 5,398,310 | 3/1995 | Tchao et al. | 395/144 |
| 5,483,468 | 1/1996 | Chen et al. | 364/51.07 |
| 5,535,331 | 7/1996 | Swoboda et al. | 395/183.4 |

OTHER PUBLICATIONS

*Automated Patent System (APS) Worstation Quick Reference Guide for Third Generation Workstation*, VSPTO, Mar. 1996.

*Text Search and Petrienl Traibarb Manual for APS*, VSPTO, Oct. 1992.

Primary Examiner—Raymond J. Bayerl
Assistant Examiner—Steven P. Sax
Attorney, Agent, or Firm—Fitzpatrick, Cella, Harper & Scinto

[57] ABSTRACT

The invention aims to provide a data input method and apparatus with improved operations capable of reusing previously input gestures with simple operations. The invention aims to improve the operation of a command designation by notifying previously input gestures and allowing a user to re-use the previously input gestures with simple operations. In order to achieve the above objects, a gesture display area for displaying previously input gestures and commands is formed on a display screen, and if the gesture display area is designated, the command corresponding to the designated gesture is executed.

46 Claims, 6 Drawing Sheets

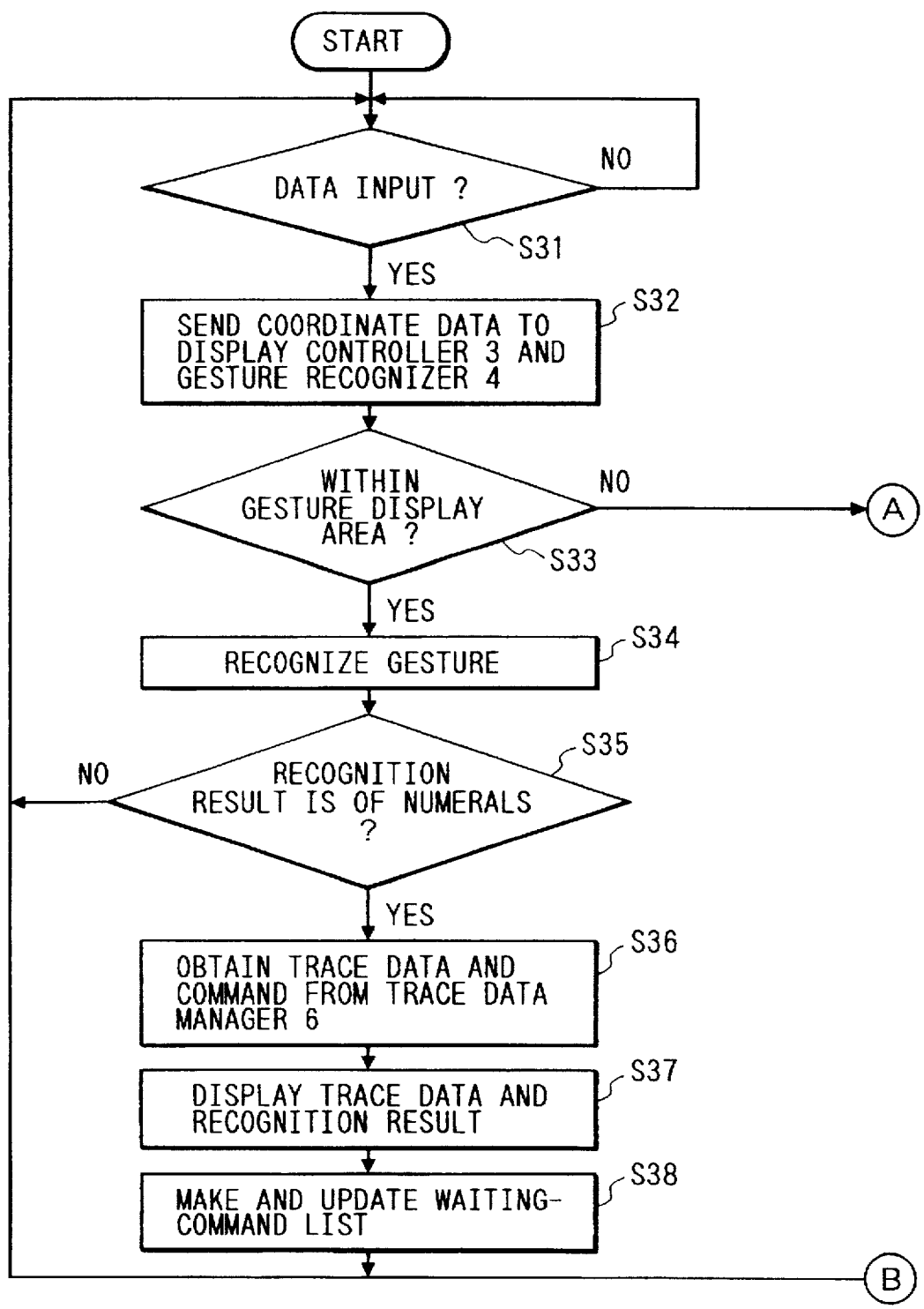

GESTURE-BASED DATA PROCESSING METHOD AND APPARATUS

BACKGROUND OF THE INVENTION

1. Field of the Invention

The present invention relates to a data processing method and apparatus in which a trace is input with a pen to instruct an operation, to a data processing method and apparatus built in with a combination of an input device for inputting data by a trace and a display device, and to a data processing method and apparatus capable of facilitating an input operation of a command repetitively used.

2. Related Background Art

An input by a "gesture" (handwritten function symbols for text editing) to a pen input type electronic apparatus has been used conventionally as a useful man-machine interface because this gesture can performs two works, including a command execution and a designation of an operand object, at the same time.

An UNDO function has been conventionally used in which the latest executed command is stored, and when deletion is instructed, the state before the latest command was executed is recovered.

With this UNDO function, however, even what command is stored (i.e., which state can be recovered) is not notified to an operator, nor the same command can be re-executed by using the stored command.

SUMMARY OF THE INVENTION

It is an object of the present invention to notify an operator of previously executed commands by displaying a history thereof on a display screen.

It is another object of the present invention to allow an operator to execute a desired command by designating it from a history of previously executed commands displayed on a display screen, so that a command designation operation is simplified, a command designation soft key display area is reduced, or a command designation keyboard is dispensed with.

It is a further object of the present invention to provide an easy-to-operate apparatus reserved with a large data input area, by efficiently generating a command display area in a small display area.

DETAILED DESCRIPTION OF THE PREFERRED EMBODIMENTS

The first embodiment of the invention will be described with reference to the accompanying drawings.

Figure 1:
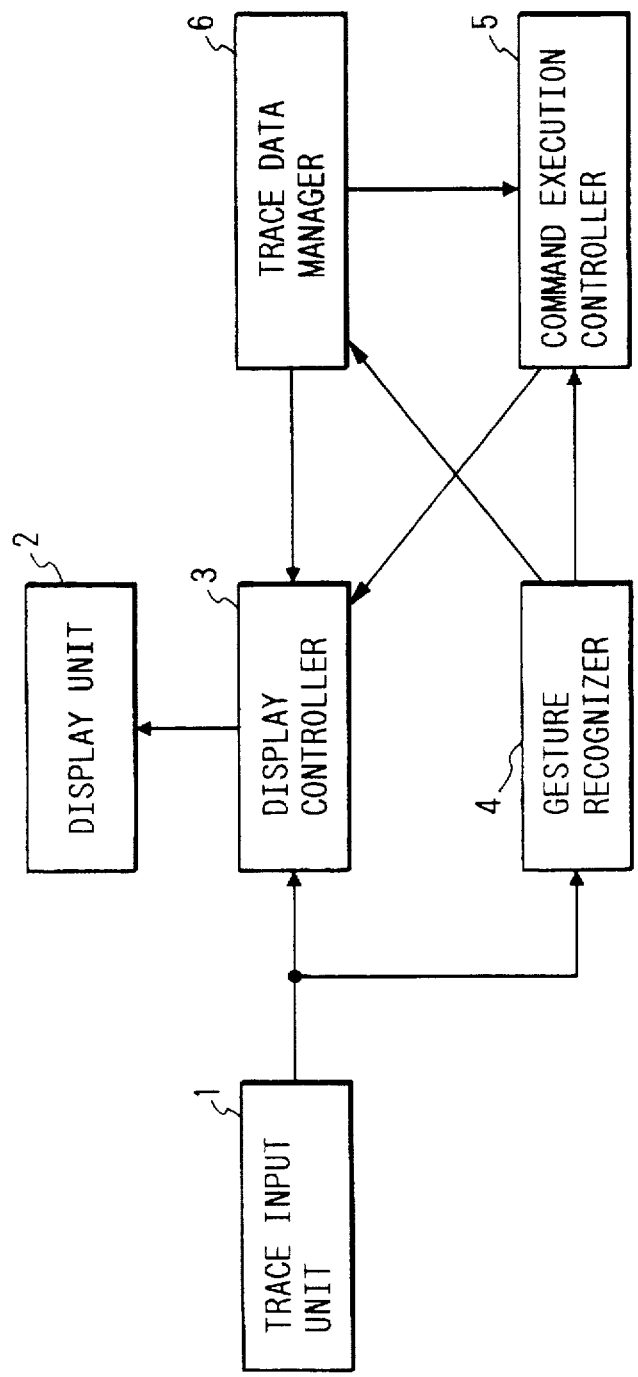
FIG. 1 is a functional block diagram of a data processing apparatus according to a first embodiment of the invention.

FIG. 1 is a functional block diagram showing a data processing apparatus according to the first embodiment. Reference numeral 1 represents a trace input unit for inputting trace data. Reference numeral 2 represents a display unit for displaying an operation object and trace data. Reference numeral 3 represents a display controller for a display control of presently and previously input trace data. Reference numeral 4 represents a gesture recognizer for recognizing an input trace as a gesture and converting it into a corresponding command. Reference numeral 5 represents a command execution controller for executing a command converted by the gesture recognizer 4 and a command corresponding to a previously input trace. Reference numeral 6 represents a trace data manager for the storage management of previously input trace data and corresponding commands recognized and converted by the gesture recognizer 4.

Figure 6:
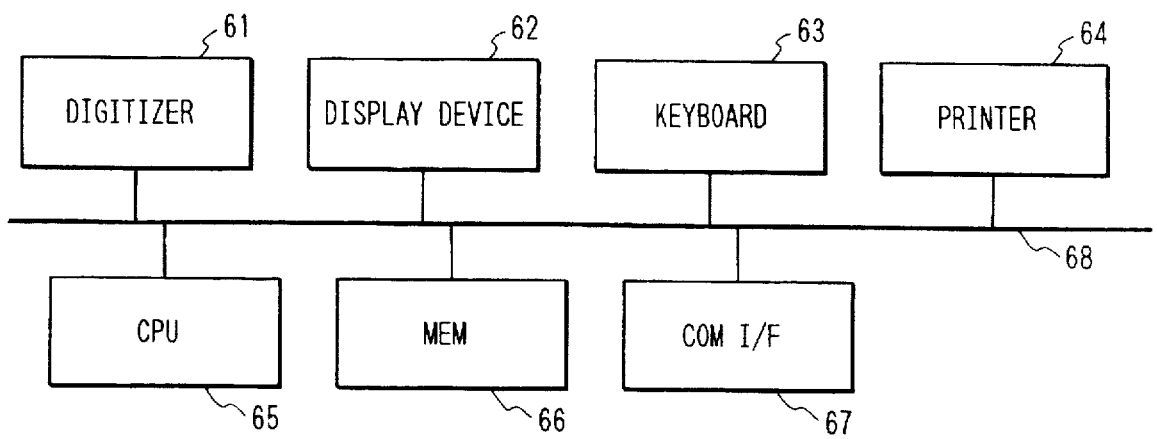
FIG. 6 is a block diagram showing the hardware structure of the data processing apparatus of the first embodiment.

FIG. 6 shows the hardware structure of the data processing apparatus of the first embodiment. Reference numeral 61 represents a digitizer or a touch panel for inputting coordinate values. The trace input unit 1 inputs a coordinate point train of a trace drawn on the digitizer 61. Reference numeral 62 represents a display device such as a liquid crystal display. Under the control of the display unit 2, trace data, character pattern data, and other display screens necessary for operations are displayed on this display device 62. If the digitizer 61 used is transparent, it may be placed on the display device 62 to form an input/output combined apparatus and improve the operation of the apparatus. Reference numeral 63 represents a keyboard from which characters and commands can be directly entered, in addition to the digitizer 61. Reference numeral 64 represents a laser beam printer (LBP) or an ink-jet type printer for printing out data input from the digitizer 61 or keyboard 63 or character patterns and the like recognized from traces input from the digitizer 61. Reference numeral 65 represents a CPU 65 for executing various processes in accordance with control programs stored in a memory 66 to be described later. The processes of the display controller 3, gesture recognizer 4, and command execution controller 5 are executed by CPU 65. The memory 66 stores control programs of various processes of this embodiment illustrated in the flow charts to be described later. The memory 66 includes a ROM and a RAM for storing various parameters used for each process and has working areas. The parameters include dictionary data for recognizing gestures and characters, numeral and condition data used for a judgement criterion at each process. The trace data manager 6 is realized in some area of the memory 66.

Data to be stored in the memory 66 may be stored in ROM in advance. Data stored in a storage unit (FD, CD-ROM, and etc.) detachable to the apparatus body or data supplied from another apparatus via a communication I/F 67 via a public telephone line or a LAN may be stored in the memory prior to the operation start.

The communication I/F 67 controls data transfer to and from another apparatus via a public telephone line or a LAN. Reference numeral 68 represents a bus for flowing data to and from each constitutional element.

Figure 4:
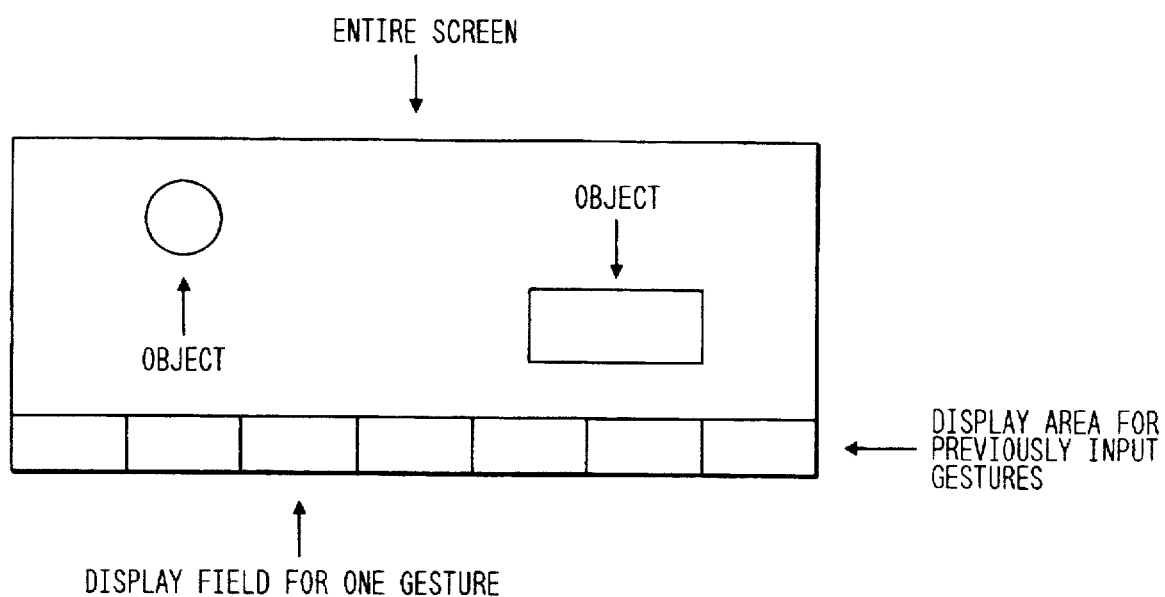
FIG. 4 is a diagram showing an example of a display screen of a display unit shown in FIG. 1.

FIG. 4 shows an example of a display screen of the display unit 2. In FIG. 4, an "object" is processed. In the example shown in FIG. 4, the objects are a circle and a rectangle drawn by the digitizer 61 or the keyboard 63. Other figures such as characters, documents, and windows may also be drawn.

In the following description, the "display area for previously input gestures" shown in FIG. 4 is simply called a "gesture display area". The gesture display area is divided into a plurality of fields as shown, one gesture being displayed in one field.

The functional blocks of the apparatus shown in FIG. 1 are actually realized, for example, by a CPU executing various calculation processes in accordance with programs, a ROM for storing programs and the like, a RAM used for calculations by CPU, an input pen, a digitizer, a liquid crystal display, and the like.

Figure 2:
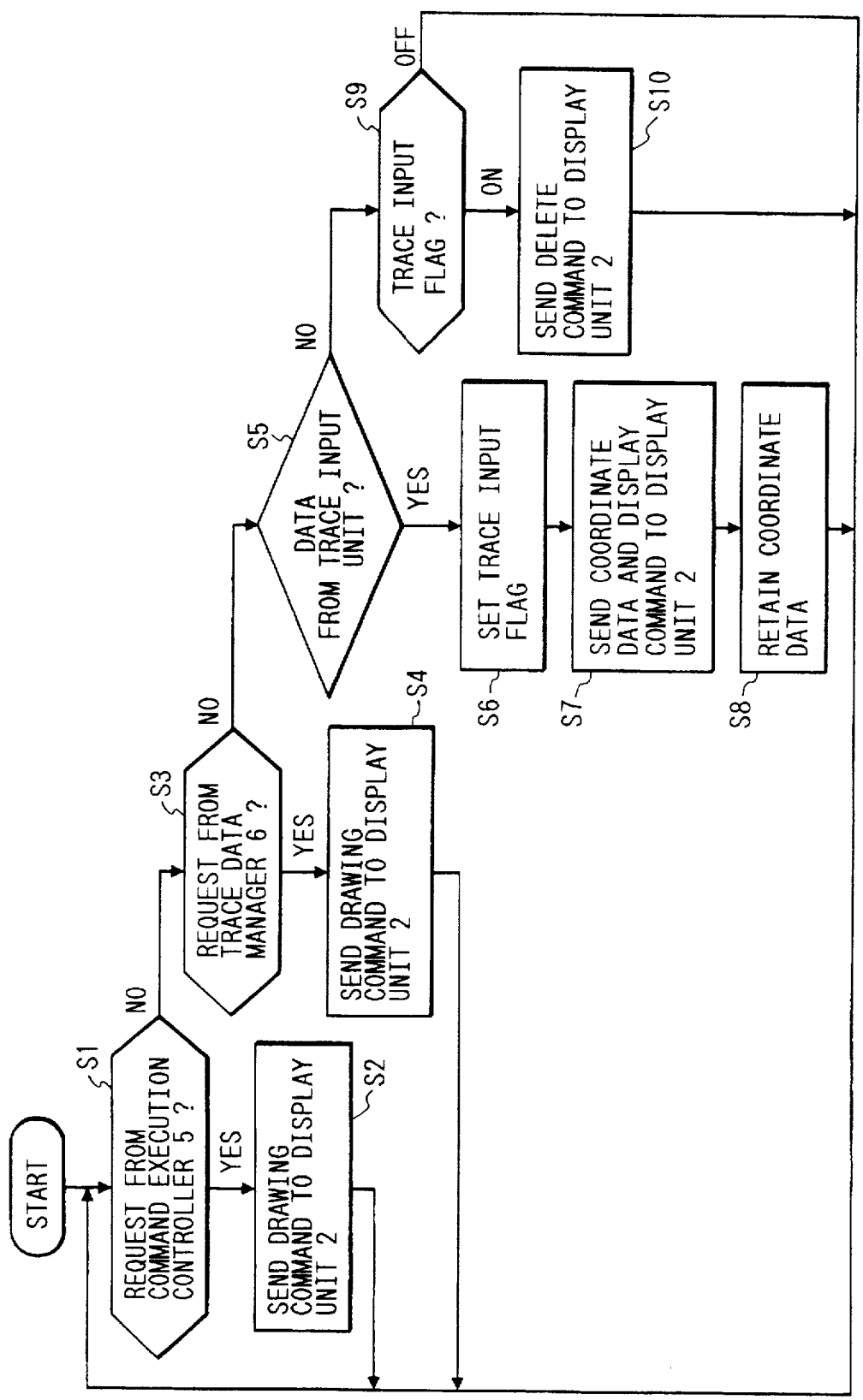
FIG. 2 is a flow chart illustrating the process to be executed by a display controller shown in FIG. 1.

FIG. 2 is a flow chart illustrating the process to be executed by the display controller 3. The process of the display controller 3 will be described with reference to this flow chart.

At Step S1 shown in FIG. 2, it is checked whether there is a rewrite request from the command execution controller 5, the rewrite request being issued when an object is moved or erased. If there is a rewrite request, a corresponding drawing command is supplied to the display unit 2 at Step S2. If there is no rewrite request, the flow advances to Step S3 whereat it is checked whether there is a rewrite request from the trace data manager 6 regarding a display of previously input traces. If there is a rewrite request, a drawing command is issued to the display unit 2 at Step S4 in accordance with the data in the trace data manager 6.

If there is no rewrite request at Step S3, the flow advances to Step S5 whereat data from the trace input unit 1 awaited. When data is input from the trace input unit 1, coordinate data is input. At this time, a flag is set at Step S6, indicating a presence of an input from the trace input unit 1. At Step S7, the coordinate data and a display command of the corresponding point are sent to the display unit 2, and at Step S8 the coordinate data is retained.

If there is no data from the trace input unit 1 at Step S5, first a flag indicating a presence of an input from the trace input unit 1 is checked at Step S9. If the flag is already set, a display erase command for the point retained at Step S8 is sent to the display unit 2 in order to erase the trace displayed at Step S10. If the flag is not set at Step S9, the flow immediately returns to Step S1.

Figure 3:
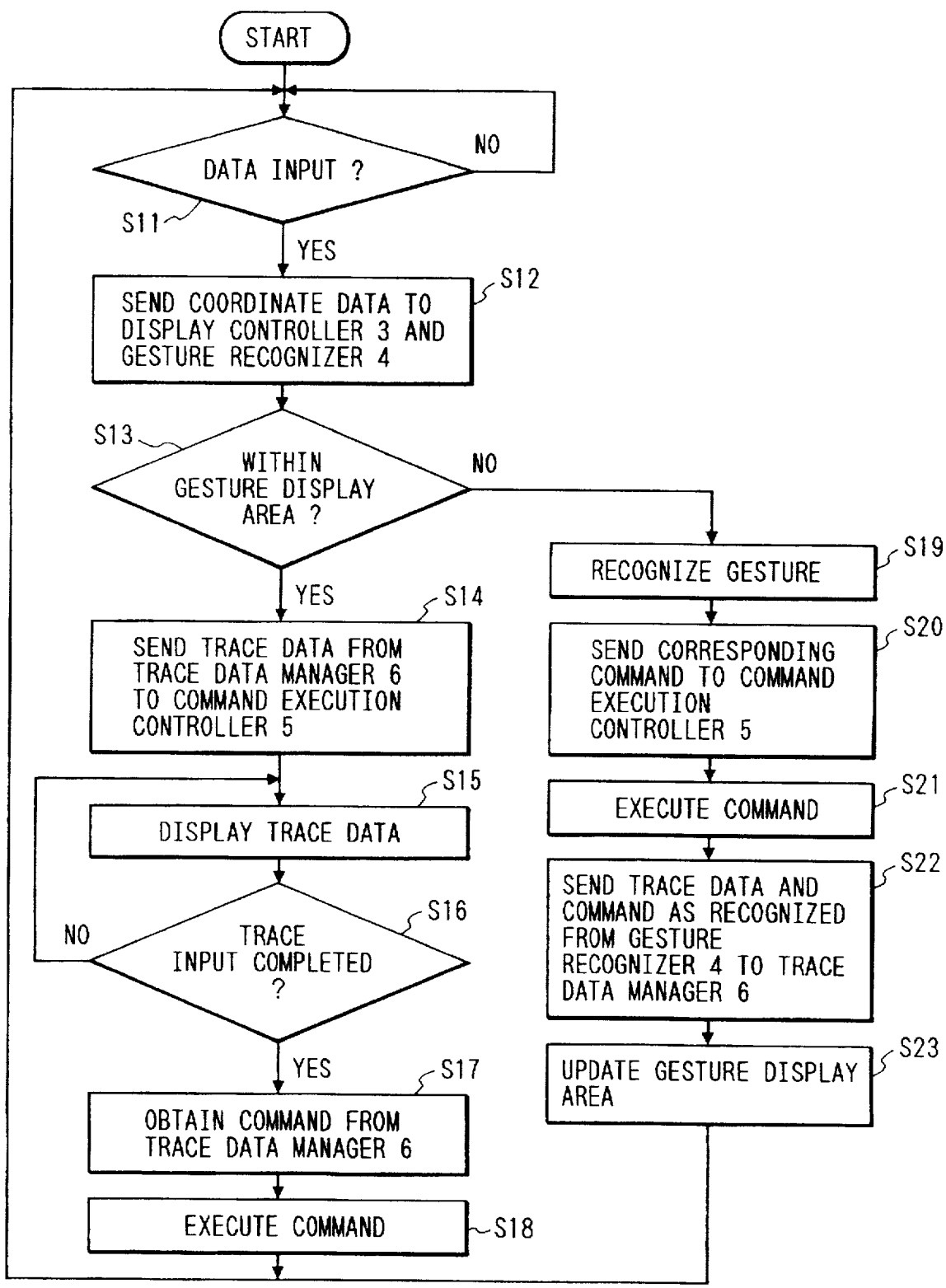
FIG. 3 is a flow chart illustrating the operation of the apparatus shown in FIG. 1.

FIG. 3 is a flow chart illustrating the whole process of the apparatus of this embodiment.

Referring to FIG. 3, an input from the trace input unit 1 is awaited at Step S11. If there is an input, the coordinate data is sent to the display controller 3 and gesture recognizer 4 at Step S12. The process to follow at the display controller 3 is the same as described with reference to FIG. 2. At Step S13 the gesture recognizer 4 checks whether the coordinate value is in the gesture display area. If in the gesture display area, trace data corresponding to the gesture displayed in the field of the input position is transferred from the trace data manager 6 to the command execution controller at Step S14.

At Step S15, a display command is issued for the trace data sent to the command execution controller 5 at Step S14. The trace data is displayed at such a position that the positional relationship between the input position and the trace displayed in the field is retained. Therefore, at this stage, the selected gesture is displayed in duplicate on the display unit 2. Next, it is checked at Step S16 whether the trace input has been completed. If not, Step S15 is repeated. In this manner, the gesture in the selected field in the gesture display area moves following the trace presently entered. If it is judged at Step S16 that the trace input has been completed, the command corresponding to the gesture retained in the trace data manager 6 is fetched at Step S17 and transferred together with the position data at the end of the trace input to the command execution controller 5 at Step S18. In this manner, the command corresponding to the selected gesture can be executed for the object at the trace input end position.

If the input position at Step S13 is not in the gesture display area, the flow advances to Step S19 whereat the gesture of the input trace is recognized, and at Step S20 the corresponding command and the command execution position are sent to the command execution controller 5. At Step S21, the command execution controller 5 executes the command sent at Step S20. At Step S22, the trace data and the recognized command are sent from the gesture recognizer 4 to the trace data manager 6 which retains the data. The data is not retained if the command corresponding to the input at Step S12 is an object movement or object re-size. At Step S22, in accordance with the data received at Step S22 and previously retained data, the trace data manager 6 instructs the display controller 3 to update the gesture display area. For example, if there are ten fields in the gesture display area, the gestures up to ten gestures are simply filled in the fields. For the eleventh gesture, the oldest gesture among the displayed ten gestures is erased, and the other gestures are shifted by one field to add the latest gesture.

In the above description, the trace of the inputted gesture is stored in the trace data manager 6. Instead, the command corresponding to the gesture and recognized at Step S19 may be stored in the memory 66, and the gesture pattern display at Step S23 may be performed by using the gesture pattern stored in the memory 66 in correspondence with the command. Instead of displaying a gesture pattern in the gesture display area, a character pattern representative of a command such as "move" and "erase" may be displayed.

The occurrence frequency information of a command recognized at Steps S14 and S19 may be stored in the memory 66. In this case, assuming that there are ten fields, five patterns corresponding to five commands in the order of high occurrence frequency are displayed in the five fields among the ten fields, and patterns corresponding to the latest five commands are displayed on the remaining five fields.

With the above processes, a desired gesture selected from the gestures displayed on the gesture display area is dragged to, and dropped at, a desired object displayed on the display screen. Therefore, the trace of the displayed gesture follows the motion of the input device such as a pen, and the same operation as when the gesture was inputted can be repeated for the object at the input end (at the dropped position). The previously input gesture can be re-used with simple operations, and the operation of the apparatus becomes easy to use.

Figure 5B:
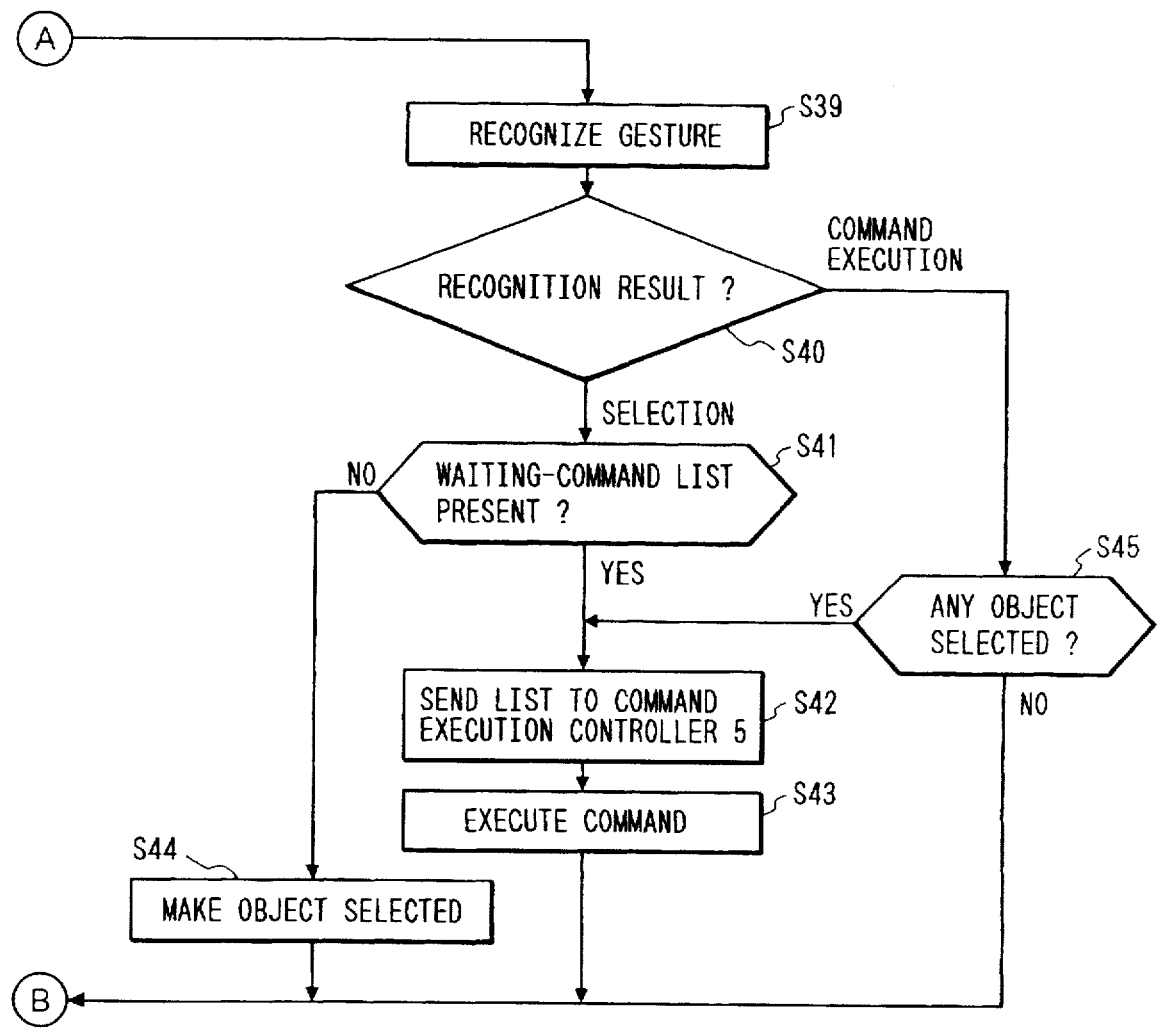
FIG. 5 is comprised of FIGS. 5A and 5B showing flow charts illustrating the operation of a pen input type electronic apparatus according to a second embodiment of the invention.

FIGS. 5A and 5B are flow charts illustrating the operation of the second embodiment, to be replaced with the operation illustrated in FIG. 3 of the first embodiment. The other points are the same as the first embodiment.

Referring to FIGS. 5A and 5B, an input from the trace input unit 1 is awaited at Step S31. If there is an input, a coordinate train sent from the trace input unit 1 is received and sent to the display controller 3 and gesture recognizer 4 at Step S32. The process to follow at the display controller 3 is the same as described with reference to FIG. 2. The gesture recognizer 4 checks at Step S33 whether the start point of the coordinate train is in the gesture display area. The trace data is recognized as a numeral at Step S34. It is checked at Step S35 whether the recognized result is a numeral. If numeral, the trace data displayed in the present input field and the corresponding command recognized by the gesture recognizer 4 are fetched from the trace data manager 6 at Step S36. At Step S37, the trace data fetched from the trace data manager 6 is displayed on the display screen at a desired position, with the numeral obtained at Step S34 being displayed together. If there are a plurality of trace data sets with numerals, the trace data sets are displayed in the order of numerals. At Step S38, the command obtained at Step S36 and the numeral obtained at step S34 are both retained (hereinafter, this command is called a "waiting-command" and waiting-commands disposed in the order of numerals are called a "waiting-command list") to generate or update a waiting-command list. The processes from Step S34 to Step S38 are repeated so long as there is any input to the gesture display area.

If the start point of the trace input is outside of the gesture display area at Step S33, gesture recognition for the trace data is performed at Step S39.

At Step S40 the result at Step S39 is judged. If it is judged at Step S40 that the gesture is an object selection gesture, then it is checked at Step S41 whether there is a waiting-command list. If present, a hot point (operation position) of the object selection gesture and the waiting-command list are transferred to the command execution controller 5 at Step S42. At Step S43, the command execution controller 5 sequentially executes the commands in the waiting-command list in the order of numerals. If there is no waiting-command list at Step S41, the object selected at Step S44 is retained as an object to be executed.

If it is judged at Step S40 that the gesture is the command execution gesture, it is first checked at Step S45 whether there is any object to be executed. If present, the processes at Steps S42 and S43 are performed, and if not present, the flow immediately returns to Step S31.

With the above processes, the following operations become possible. The numerals in the execution order are written over the gestures displayed in the gesture display area, and thereafter the objects to be subjected to the gestures are selected. In this manner, commands corresponding to these gestures can be sequentially executed in the order designated by the operator. Conversely, the objects are first selected, and thereafter the numerals in the execution order are written over the gestures corresponding to the commands to be executed. In this manner, upon an input of a designated sequential command execution gesture, a series of commands corresponding to the selected gestures can be executed in the order designated by the operator. The apparatus can be therefore made easier to use when a plurality of commands are executed.

In the above embodiments, drawing a gesture and designating a gesture in the gesture display area are both performed with a pen. Obviously, if a trace input means is a touch panel, a finger is used for the input, also a mouse, a keyboard, and the like may be used for entering a trace and designating a gesture in the gesture display area.

What is claimed is:

1. A data processing apparatus usable with input means for inputting a trace and with recognizing means for recognizing the trace input by the input means as a gesture and converting the gesture into a corresponding command, said apparatus comprising:

retaining means for retaining a trace of the gesture input from the input means and a command corresponding to the trace;

display means for displaying a plurality of gestures corresponding to traces of gestures retained by said retaining means;

selection means for selecting a gesture from the plurality of gestures displayed by said display means;

designation means for designating an operand object; and execution means for executing a command corresponding to the gesture selected by said selection means for the operand object designated by said designation means.

2. A data processing apparatus according to claim 1, wherein said selection means selects a plurality of gestures in an sequential order and said execution means executes commands for the plurality of gestures selected by said selection means in the sequential order.

3. A data processing apparatus according to claim 1, wherein said means for inputting the trace is a digitizer.

4. A data processing apparatus according to claim 1, wherein said display means is a liquid crystal display.

5. An apparatus according to claim 1, wherein said display means displays the trace of the gesture together with a plurality of operand objects one of which can be designated by said designation means.

6. An apparatus according to claim 1, wherein said display means displays a command instead of a trace of a gesture.

7. An apparatus according to claim 1, wherein when a new trace is input, said display means displays a new gesture in addition to the displayed gestures.

8. A data processing apparatus comprising:

command input means for inputting a command;

command history storing means for storing a history of a plurality of commands input by said command input means;

display control means for controlling a display device to display a plurality of patterns corresponding to a plurality of commands determined by the history of the plurality of commands stored in said command history storing means;

selection means for selecting a pattern from the plurality of patterns displayed by the display control means;

designation means for designating an operand object; and execution means for executing a command corresponding to a selected one of the plurality of patterns on the display device for the operand object designated by said designation means.

9. A data processing apparatus according to claim 8, wherein said command history storing means stores latest N commands input from said command input means in the input order of N commands.

10. A data processing apparatus according to claim 9, wherein said display control means controls to display N patterns corresponding to N commands stored in said command history storing means in the order of storing N commands.

11. A data processing apparatus according to claim 8, wherein said command history storing means stores an input occurrence frequency of a command input from said command input means, and said display control means determines a command whose pattern is to be displayed, in accordance with input occurrence frequencies of a plurality of commands stored in said command history storing means.

12. A data processing apparatus according to claim 8, wherein said command input means is a digitizer.

13. A data processing apparatus according to claim 8, wherein said command input means is a keyboard.

14. An apparatus according to claim 8, wherein said display control means controls the display device to display the plurality of patterns together with a plurality of operand object one of which can be designated by said designation means.

15. An apparatus according to claim 8, wherein when a new command is input, said display control means controls the display device to display a pattern corresponding to the new command in addition to the displayed patterns.

16. A data processing method usable with an input device for inputting a trace and with a recognizing device for recognizing the input trace as a gesture and converting the gesture into a corresponding command, comprising the steps of:

retaining a trace of the gesture input by the input device and a command corresponding to the trace;

displaying a plurality of gestures on a display, the plurality of gestures corresponding to traces retained by said retaining step;

selecting a gesture from the plurality of gestures displayed by the displaying step;

designating an operand object; and executing a command corresponding to the selected gesture for the designated operand object.

17. A data processing method according to claim 16, wherein said selecting step selects a plurality of gestures in a sequential and said executing step executes commands for the plurality of selected gestures in the sequential order.

18. A data processing method according to claim 16, wherein the input device comprises a digitizer.

19. A data processing method according to claim 16, wherein the display comprises a liquid crystal display.

20. A data processing method comprising the steps of:

inputting a plurality of commands;

storing a history of the plurality of input commands; and controlling a display device to display a plurality of patterns corresponding to a plurality of commands determined by the history of the plurality of stored commands;

selecting a pattern from the plurality of patterns displayed by the controlling step;

designating an operand object; and executing a command corresponding to a selected one of the plurality of patterns on the display device for the operand object designated by said designating step.

21. A data processing method according to claim 20, wherein said command history stores latest input N commands in the input order of N commands.

22. A data processing method according to claim 21, wherein N patterns corresponding to the stored N commands are displayed in the order of storing N commands.

23. A data processing method according to claim 20, wherein the command history includes an input occurrence frequency of an input command, and a command whose pattern is to be displayed, is determined in accordance with input occurrence frequencies of a plurality of stored commands.

24. A data processing method according to claim 20, wherein said command input step inputs the command with a digitizer.

25. A data processing method according to claim 20, wherein said command input step inputs the commands with a keyboard.

26. A memory medium storing computer-executable process steps, the process steps for data processing using an input device for inputting a trace and a recognizing device for recognizing the input trace as a gesture and converting the gesture into a corresponding command, the process steps comprising:

a retaining step to retain a trace of the gesture input by the input device and a command corresponding to the trace;

a displaying step to display the trace of the gesture retained by said retaining step in a display;

a selecting step to select a desired gesture from a plurality of the gestures displayed by the displaying step;

a designating step to designate an operation object; and an executing step to execute a command corresponding to the selected gesture for a designated operation object.

27. A memory medium storing computer-executable process steps according to claim 26, wherein said selecting step selects a plurality of gestures in a sequential and said executing step executes commands for the plurality of selected gestures in the sequential order.

28. A memory medium storing computer-executable process steps according to claim 26, wherein the input device comprises a digitizer.

29. A memory medium storing computer-executable process steps according to claim 26, wherein the display comprises a liquid crystal display.

30. A memory medium storing computer-executable process steps for processing data, the process steps comprising:

an inputting step to input a plurality of commands;

a storing step to store a history of the plurality of input commands; and a controlling step to control a display device to display a plurality of patterns corresponding to a plurality of commands determined by the history of the plurality of stored commands;

a selecting step to select a pattern from the plurality of patterns displayed in the controlling step;

a designating step to designate an operation object; and an executing step to execute a command corresponding to one of the plurality of patterns, the one pattern being selected on the display device, for the operation object designated by said designating step.

31. A memory medium storing computer-executable process steps according to claim 30, further comprising the process steps of:

a selecting step to select a desired pattern from the plurality of displayed patterns; and an executing step to execute a command corresponding to the selected pattern.

32. A memory medium storing computer-executable process steps according to claim 30, wherein said command history stores latest input N commands in the input order of N commands.

33. A memory medium storing computer-executable process steps according to claim 32, wherein N patterns corresponding to the stored N commands are displayed in the order of storing N commands.

34. A memory medium storing computer-executable process steps according to claim 30, wherein the command history includes an input occurrence frequency of an input command, and a command whose pattern is to be displayed, is determined in accordance with input occurrence frequencies of a plurality of stored commands.

35. A memory medium storing computer-executable process steps according to claim 30, wherein said command input step inputs the command with a digitizer.

36. A memory medium storing computer-executable process steps according to claim 30, wherein said command input step inputs the commands with a keyboard.

37. An apparatus according to claim 16, wherein said display means displays the trace of the gesture together with a plurality of operand objects one of which can be designated by said designation means.

38. An apparatus according to claim 16, wherein said display means displays a command instead of a trace of a gesture.

39. An apparatus according to claim 16, wherein when a new trace is input, said display means displays a new gesture in addition to the displayed gestures.

40. An apparatus according to claim 20, wherein said display control means controls the display device to display the plurality of patterns together with a plurality of operand object one of which can be designated by said designation means.

41. An apparatus according to claim 20, wherein when a new command is input, said display control means controls the display device to display a pattern corresponding to the new command in addition to the displayed patterns.

42. A memory medium storing computer-executable process steps according to claim 26, wherein said displaying step displays the trace of the gesture together with a plurality of operand objects one of which can be designated by designating step.

43. A memory medium storing computer-executable process steps according to claim 26, wherein said displaying step displays a command instead of a trace of a gesture.

44. A memory medium storing computer-executable process steps according to claim 26, wherein when a new trace is input, said displaying step displays a new gesture in addition to the displayed gestures.

45. A memory medium storing computer-executable process steps according to claim 30, wherein said display controlling step controls the display device to display the plurality of patterns together with a plurality of operand object one of which can be designated by said designating step.

46. A memory medium storing computer-executable process steps according to claim 30, wherein when a new command is input, said display controlling step controls the display device to display a pattern corresponding to the new command in addition to the displayed patterns.

* * * * *

UNITED STATES PATENT AND TRADEMARK OFFICE
CERTIFICATE OF CORRECTION

PATENT NO. : 5,798,758

DATED : August 25, 1998

INVENTORS : TAKASHI HARADA, et al.

Page 1 of 2

It is certified that error appears in the above-identified patent and that said Letters Patent is hereby corrected as shown below:

COVER PAGE
[56] OTHER PUBLICATIONS
"VSPTO," should read --USPTO,--
"Petrienl Traibarb Manual for APS, VSPTO," should read
  --Retrieval Training Manual for APS, USPTO,--.

COLUMN 1
Line 18, "performs" should read --perform--;
Line 42, "reserved" should read --provided--.

COLUMN 2
Line 50, "and" should be deleted.
Line 51, "to" should read --from--.

COLUMN 3
Line 26, "1" should read --1 is--.
Line 48, "If" should read --If it is--.

COLUMN 4
Line 65, "If" should read --If it is--.

COLUMN 5
Line 19, "If" should read --If such a list is--;
Line 29, "If" should read --If an object is--.

COLUMN 6
Line 7, "an" should read --a--;
Line 64, "object" should read --objects--.

UNITED STATES PATENT AND TRADEMARK OFFICE
CERTIFICATE OF CORRECTION

PATENT NO. : 5,798,758

DATED : August 25, 1998

INVENTORS : TAKASHI HARADA, et al.   Page 2 of 2

It is certified that error appears in the above-identified patent and that said Letters Patent is hereby corrected as shown below:

COLUMN 7
Line 20, "sequential" should read --sequential order--.

COLUMN 8
Line 5, "operation" should read --operand--;
Line 7, "operation" should read --operand--;
Line 10, "sequential" should read --sequential order--;
Line 31, "operation" should read --operand--;
Line 34, "operation" should read --operand--.

COLUMN 9
Line 10, "object" should read --objects--;
Line 19, ""by" should read --by said--.

COLUMN 10
Line 12, "object" should read --objects--.

Signed and Sealed this

Sixth Day of April, 1999

*Attest:*

Q. TODD DICKINSON

*Attesting Officer*      *Acting Commissioner of Patents and Trademarks*